United States Patent
Brüls et al.

(10) Patent No.: US 7,103,104 B1
(45) Date of Patent: Sep. 5, 2006

(54) EMBEDDING AUXILIARY DATA IN AN INFORMATION SIGNAL

(75) Inventors: Wilhelmus Hendrikus Alfonsus Brüls, Eindhoven (NL); Adrianus Johannes Maria Denissen, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 640 days.

(21) Appl. No.: 09/614,810

(22) Filed: Jul. 12, 2000

(30) Foreign Application Priority Data

Jul. 15, 1999 (EP) .................................. 99202334

(51) Int. Cl.
H06B 1/66 (2006.01)
H04N 7/12 (2006.01)

(52) U.S. Cl. ................................ 375/240.26

(58) Field of Classification Search ........... 375/240.26; 382/100, 232, 173, 234, 233, 243; 348/412.1; H04N 7/12
See application file for complete search history.

(56) References Cited

U.S. PATENT DOCUMENTS

| 6,229,924 B1* | 5/2001 | Rhoads et al. | 382/232 |
| 6,300,888 B1* | 10/2001 | Chen et al. | 341/63 |
| 6,373,530 B1* | 4/2002 | Birks et al. | 348/584 |
| 6,373,960 B1* | 4/2002 | Conover et al. | 382/100 |

FOREIGN PATENT DOCUMENTS

| EP | 0359325 A1 | 3/1990 |
| EP | 0545915 A2 | 6/1993 |

OTHER PUBLICATIONS

Microsoft Press, Computer Dictionary, Thir Edition, 1997, p. 475.*
F. Hartung and B. Girod: "Digital Watermarking of MPEG-2 Coded Video in the Bitstream Domain", Published in ICASSP vol. 4, 1997, pp. 2621-2624.
Hartung F. et al, "Digital Watermarking of MPEG-2 Coded Video in the Bitstream Domain", Plenary, Expert Summaries, Special, Audio, Underwater Acoustics, VLSI. Munich, Apr. 21-24, 1997, Los Alimitos, CA: IEEE Comp. Soc. Press, US., pp. 2621-2624, XP000937951, ISBN: 0-8186-7920-4.

* cited by examiner

Primary Examiner—Nhon Diep
(74) Attorney, Agent, or Firm—Larry Liberchuk

(57) ABSTRACT

Disclosed is a method of embedding auxiliary data in an information signal, the signal samples of which are variable-length encoded, for example, an MPEG compressed video signal. Selected signal samples, e.g. given transform coefficients of the blocks constituting a video image, are retrieved by decoding the corresponding variable-length code words. The selected signal samples are modified so as to represent a data symbol, and re-encoded. The modification of a signal sample is omitted if this causes the length of a given sequence of code words (a slice, an MPEG transport packet) to exceed its original length, or if it affects the position of clock reference time stamps in the bit stream. Insertion of dummy bits compensates for a shortage of data in the sequence.

14 Claims, 4 Drawing Sheets

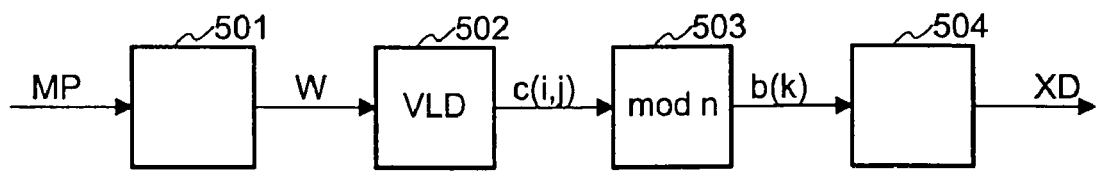
FIG. 4
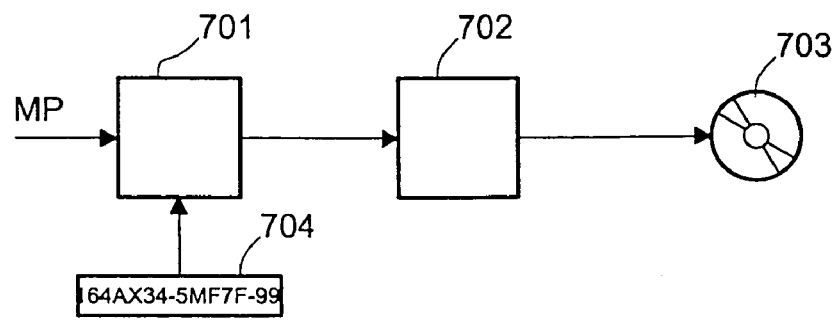
FIG. 5
FIG. 6
FIG. 7

EMBEDDING AUXILIARY DATA IN AN INFORMATION SIGNAL

FIELD OF THE INVENTION

The invention relates to a method of embedding auxiliary data in an information signal, for example, an audio or video signal, by modifying selected signal samples so as to represent respective symbols of said auxiliary data. The invention also relates to a method of retrieving auxiliary data from such an information signal.

BACKGROUND OF THE INVENTION

A known method of embedding auxiliary data as defined in the opening paragraph is disclosed in European Patent Application EP-A-0 359 325. In this prior-art method, embedding of the auxiliary data takes place in the original signal domain. Digitized audio samples or video pixels are modified so as to represent bits of an auxiliary data signal. Various examples of this modification are disclosed. One example is described in the introductory part of the patent application, viz. replacing the least significant bit of every n-th audio sample by an auxiliary data bit. Another example is replacing the least significant bit of every n-th sample by the exclusive OR of its most significant bit and an auxiliary data bit.

Nowadays, audio and video signals are often compressed prior to transmission and/or storage. Applying the prior art to such signals requires the compressed signal to be decoded and re-encoded. Not only is this an expensive operation, it is also unreliable because the auxiliary data information accommodated in the least significant bit of a signal sample may get lost in the compression stage.

OBJECT AND SUMMARY OF THE INVENTION

It is an object of the invention to embed auxiliary data in a compressed information signal in a cost-effective and reliable manner.

In accordance with the invention, the signal samples are transform coefficients obtained by transform coding the information signal and encoded into variable-length code words. The method is further characterized in that it comprises the steps of decoding a variable-length code word indicative of a selected coefficient, modifying said selected coefficient so as to represent an auxiliary data symbol, encoding the modified coefficient into a new variable-length code word, and replacing the old code word by the new code word. It is thereby achieved that the auxiliary data is embedded without first inverse transforming the compressed signal to the original signal domain.

The corresponding method of retrieving auxiliary data comprises the steps of decoding variable-length code words indicative of said selected coefficients, and retrieving each auxiliary data symbol from said decoded coefficients. The auxiliary data is thus detected without first inverse transforming the compressed signal to the original signal domain.

It is to be noted that embedding auxiliary data in a transform coded signal is known per se from F. Hartung and B. Girod: "Digital Watermarking of MPEG-2 Coded Video in the Bitstream Domain", published in ICASSP Vol. 4, 1997, pp. 2621–2624. In this prior-art method, the embedded data is a watermark represented by a pseudo-noise sequence in the original signal domain. The watermark is discrete cosine transformed prior to embedding. Non-zero coefficients of the compressed signal are modified by adding thereto the corresponding coefficients of the transformed watermark block. The recovery of the hidden information is accomplished by correlating the watermarked video signal with the same pseudo-noise sequence. This correlation requires the pseudo-noise sequence to be available, and is carried out in the signal domain. The invention differs from this prior art in that data symbols are directly represented by specific coefficient values, without first transforming the data. The auxiliary data thus embedded can be retrieved in the compressed signal domain.

In an embodiment of the method, the step of replacing the old code word by a new code word is omitted if said replacing causes the length of a given sequence of new code words to substantially exceed the length of the corresponding sequence of old code words, e.g. by a predetermined number of bits. Examples of such sequences are slices, images, or transport packets of an MPEG video stream. As compared with the above-mentioned Hartung et al. article, in which a coefficient is replaced only if the corresponding new code word is shorter or equally long, code words may now be replaced by longer ones as long as an increase of their cumulative lengths is compensated by shorter, other new code words. More coefficients can thus be modified without affecting bit rate or storage capacity. Buffers are not required, and timing stamps remain at their respective positions in the bit stream. The potential objection of not being allowed to modify all the coefficients representing a data symbol is met by having auxiliary data words each represented by plural combinations of data symbols, i.e. by providing redundancy in the coding scheme.

Conversely, if replacing code words causes the length of a sequence to substantially fall short of the length of the original sequence, dummy bits are inserted in a preferred embodiment of the method so as to keep the bit rate constant. Known compression standards such as MPEG already provide fields for accommodating such dummy bits.

In a preferred embodiment, the selected coefficient is a differential DC coefficient representing the difference between DC coefficients of successive blocks of coefficients. Such a differential DC coefficient is always present and can easily be found in the bit stream. In order to prevent modifications of the differential DC components from causing the average luminance or chrominance level to drift away in a receiver, the modification is preferably such that the sum of differential DC coefficients of a given series of blocks (for example, a slice) is not substantially modified.

The data symbols constituting the auxiliary data "alphabet" may be represented in accordance with the examples disclosed in EP-A-0 359 325. For example, the alphabet may have two symbols "0" and "1", represented by the least significant bit of the selected coefficients. In an embodiment of this invention, the alphabet has n symbols, represented by the modulo-n value of the selected coefficient. The number n may be 2, in which case even coefficient values represent a data symbol "0" and odd coefficient values represent a data symbol "1".

BRIEF DESCRIPTION OF THE DRAWINGS

The above described and further aspects of the invention are apparent from and will be elucidated with reference to the embodiments described hereinafter.

FIG. 4 shows further diagrams to illustrate an example of the operation of the arrangement which is shown in FIG. 2.

FIG. 5 shows a schematic diagram of an arrangement for retrieving the auxiliary data from the information signal.

FIG. 6 shows a diagram to illustrate the operation of the arrangement which is shown in FIG. 5.

FIG. 7 shows schematically a diagram of a video recorder including the arrangement which is shown in FIG. 2.

DESCRIPTION OF A PREFERRED EMBODIMENT

Before describing an arrangement for embedding data in a compressed information signal, a known example of the format of such a compressed signal will be briefly described. Reference will be made to an MPEG compressed video signal, but the invention is not limited to embedding data in such an MPEG signal.

Figure 1A:
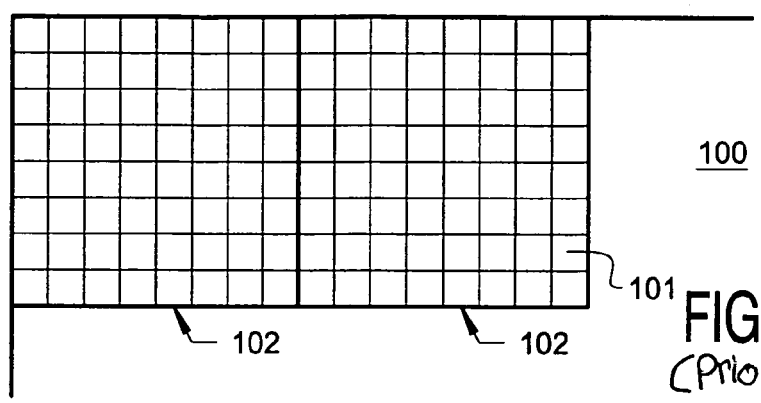
FIGS. 1A–1D show diagrams to illustrate the known format of an MPEG compressed video signal.
Figure 1B:
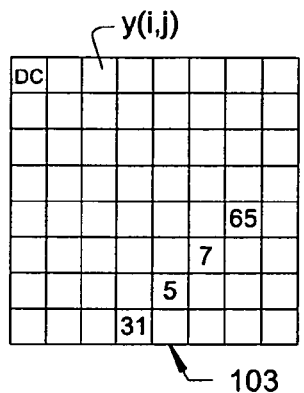
Figure 1C:
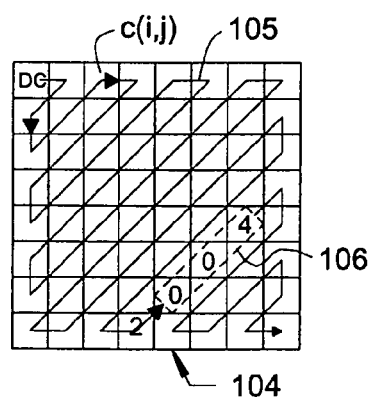

FIG. 1A shows upper left image pixels 101 of a video image 100. The image is divided into blocks 102 of 8×8 pixels, two of which are shown in the Figure. Each pixel block is subjected to an orthogonal transform, usually the discrete cosine transform (DCT). The DCT yields a block 103 of 8×8 transform coefficients y(i,j) as shown in FIG. 1B. The upper left transform coefficient of a block represents the average luminance of the corresponding pixel block and is commonly referred to as the DC coefficient. The other coefficients represent spatial frequencies and are referred to as AC coefficients. A few AC coefficient values are shown in FIG. 1B. The AC coefficients are quantized, using a given quantization step size. FIG. 1C shows a block of quantized coefficients c(i,j). The coefficient values shown in this Figure are the quantized versions (here with a step size 16) of the corresponding coefficients shown in FIG. 1B. Quantization causes many AC coefficients of block 104 to assume the value zero.

The quantized coefficients c(i,j) of a block are then sequentially read in accordance with a zigzag pattern 105 and variable-length encoded. The variable-length encoding scheme is a combination of Huffman coding and run-length coding. More particularly, each run of zero AC coefficients and a subsequent non-zero AC coefficient are packed into a single variable-length code (VLC) word. For example, the series 106 of coefficient values in FIG. 1C is encoded into a VLC word "(2,4)" where the first number indicates a run of 2 zeroes and the second number indicates the value 4 of the non-zero coefficient. The DC coefficient of a block is DPCM encoded into a differential coefficient dc and then variable-length encoded.

Figure 1D:
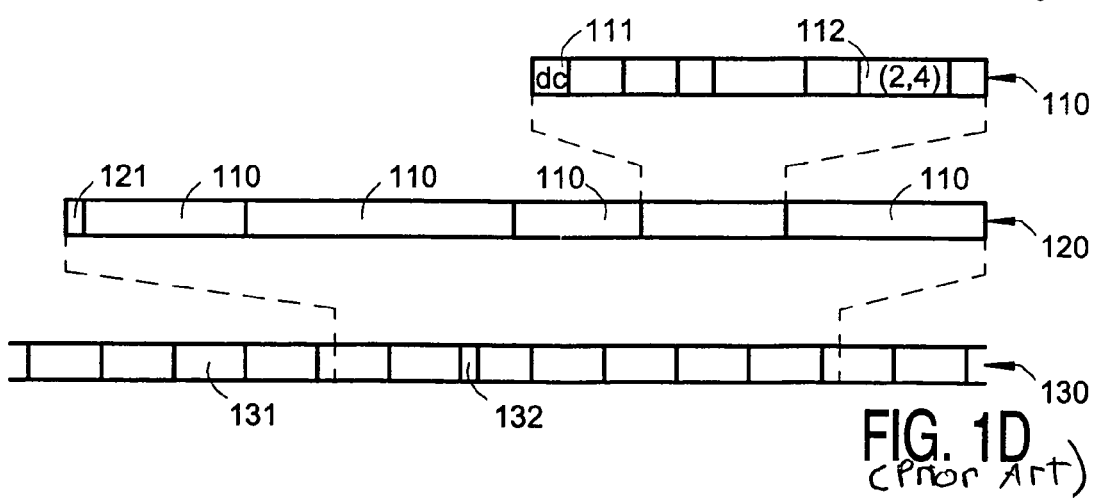

Reference numeral 110 in FIG. 1D denotes the series of VLC words representing DCT block 104. The series includes a VLC word 111 representing the differential DC coefficient dc and a VLC word 112 representing the coefficient series 106. Reference numeral 120 in FIG. 1D denotes a slice. In MPEG, a slice is a series of successive DCT blocks. Each slice starts with a slice header 121 including a sync word, which enables the slice to be easily found in the bit stream. A number of slices constitutes an image, and a series of images constitutes a video sequence. The resulting bit stream 130 is also shown in FIG. 1D. The stream is packetized in fixed-length transport packets 131 of 188 bytes each. Some packets include, inter alia, a Program Clock Reference (PCR) field 132. Said PCR indicates the intended time of its arrival. In a receiver, it is used to synchronize a local time clock generator for controlling the timing of image decoding and representation.

Figure 2:
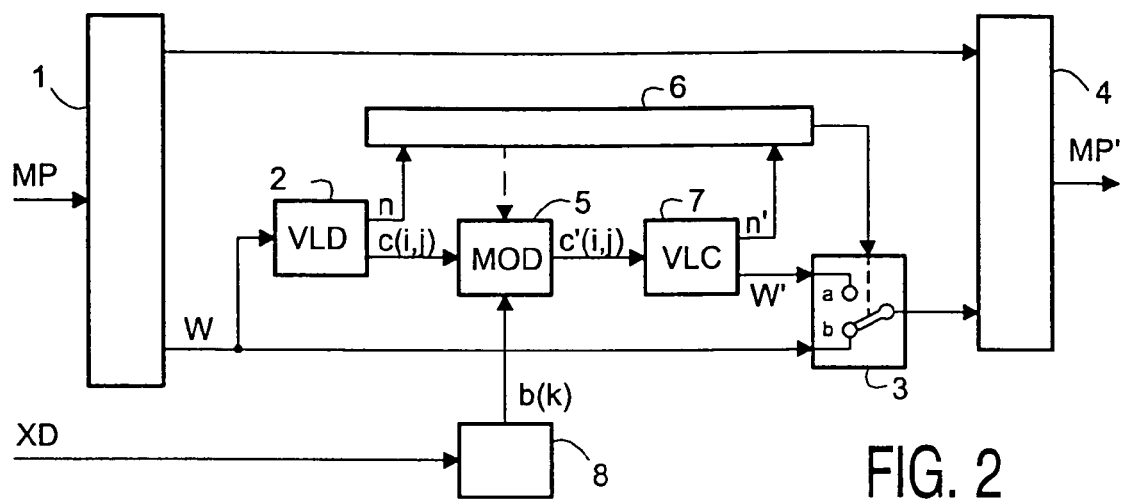
FIG. 2 shows a schematic diagram of an arrangement for embedding auxiliary data in an information signal in accordance with the invention.

FIG. 2 shows schematically an arrangement for embedding auxiliary data in an information signal. The arrangement receives an MPEG compressed video signal MP having the format 130 shown in FIG. 1D. The signal is applied to a parser 1 which extracts particular VLC words W from the bit stream and applies said VLC words to a variable-length decoder 2 and one input of a switch 3. The rest of the bit stream, i.e. the non-selected VLC words and other information such as headers, time stamps, motion vectors, etc., are directly fed to an output multiplexer 4 of the arrangement. An output of the switch 3 is also applied to said multiplexer.

The particular VLC word W applied to the variable-length decoder 2 is the code word representing a given transform coefficient c(i,j) of each DCT block, for example, the coefficient c(6,4) represented by VLC word 112 (see FIG. 1D) or, preferably, the differential DC coefficient dc represented by the VLC word 111 (see FIG. 1D). The variable-length decoder 2 decodes the coefficient c(i,j) and the length n of the VLC word. The coefficient c(i,j) is applied to a modification circuit 5. The length n is applied to a control circuit 6.

The modification circuit 5 modifies c(i,j) in a manner to be described hereinafter. The modified coefficient c'(i,j) and the preceding run of zeroes, if any, are re-encoded by a variable-length encoder 7 into a new VLC word W' using the same code book as the variable-length decoder 2. The length n' of the new VLC word is applied to the control circuit 6. As will be described hereinafter, the control circuit 6 controls the switch 3 to select either the original VLC code word W or the new VLC word W'. The selected code word is then re-inserted at its original location in the bit stream MP by the multiplexer 4. The output of the arrangement is a modified MPEG bit stream MP'.

The arrangement further receives an auxiliary data message XD. By way of example, it will be assumed hereinafter that the auxiliary data message is a string of alphanumeric characters, each of which is to be embedded in an image of the video signal. The message is applied to a data symbol generator 8, which generates a number of symbols (or digits) b(k) for each alphanumeric character. In accordance with an aspect of the invention, each symbol is a modulo-n number, where n is a predetermined integer. For example, for n=4, the symbols are 0, 1, 2 and 3. For n=3, the symbols are 0, 1 and 2. In the present example, it will be assumed that n=2, i.e. the symbols are 0 and 1, i.e. conventional bits.

As will become clear hereinafter, not all symbols representing a character can be correctly embedded in an image. To this end, the coding scheme applied by the data symbol generator 8 provides redundancy so that a character can be correctly decoded at the receiver end, even if some symbols are erroneous. Literature provides many well-known redundant coding schemes. In the embodiment described here, the data symbol generator generates one bit per image block. For conventional 625-line television systems having 576 pixels vertically and 768 pixels horizontally, the number of 8×8 blocks is 72×96=6912. Each character is thus encoded in 6912 bits b(k), where k=1 . . . 6912 denotes the position of an image block within an image.

The modification circuit 5 is arranged to modify a given transform coefficient c(i,j) of each block in accordance with the corresponding symbol of the character code. The given transform coefficient c(i,j) may be the DC coefficient c(0,0) or the difference between said DC coefficient and the DC coefficient of the previous DCT block. The given transform coefficient may also be the $k^{th}$ coefficient of the zigzag sequence, k being sufficiently high to mask artifacts caused by the modification. It is also possible to modify two or more given coefficients of each block.

The modification circuit modifies c(i,j) in such a way that the modulo-n value of the output coefficient c'(i,j) represents the symbol. Obviously, the coefficient c(i,j) will not be modified if it has already a suitable value. The coefficient will neither be modified if it is an AC coefficient having the value zero, because this would considerably complicate the process of re-encoding. In the present example, the differential DC coefficient dc will be modified, and each data symbol b(k) is 0 or 1. The differential DC coefficient will be modified to assume an even value if b(k)=0 and an odd value if b(k)=1. The modification is carried out by adding +1 or −1 to the coefficient. The choice of adding +1 or −1 may depend on the cumulative sum of the differential DC coefficients already processed. The choice of adding +1 or −1 may also depend on the length of the code word W' after variable-length re-encoding. To this end, the modification circuit receives additional information from control circuit 6 as shown by a dashed line in FIG. 2.

Figure 3:
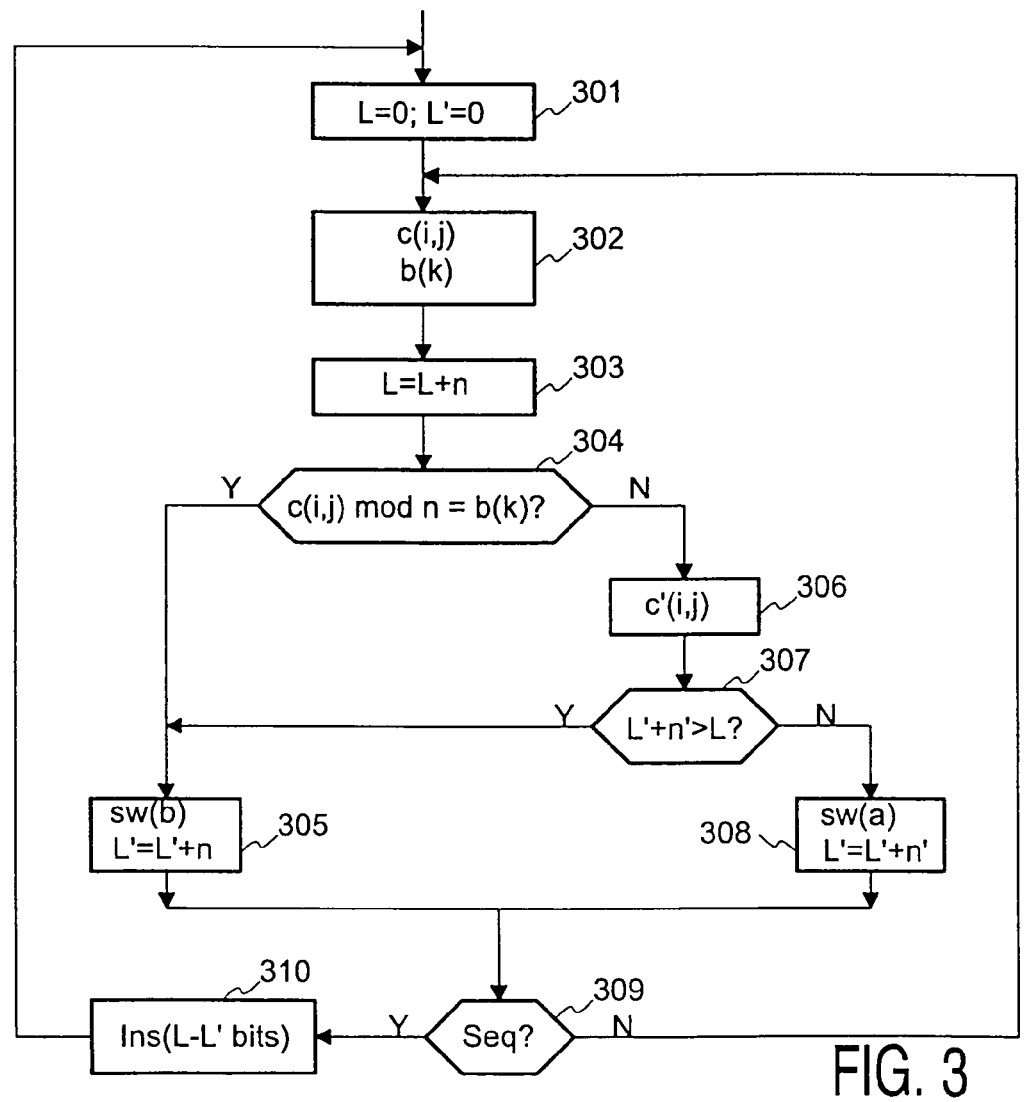
FIG. 3 shows a flow chart of operations carried out by an embodiment of the arrangement which is shown in FIG. 2.

The operation of the arrangement which is shown in FIG. 2 is further defined by the operation of the control circuit 6, and will now be described with reference to a flow chart of operational steps which is shown in FIG. 3. The operation starts upon detection of the start of an image in the MPEG bit stream. In a step 301, variables L and L' assume an initial value 0. The variable L keeps the cumulative length of received code words W. The variable L' keeps the cumulative length of the corresponding transmitted code words.

In a step 302, the predetermined coefficient c(i,j) of DCT block k and the bit b(k) to be embedded in said block are received. In a step 303, the control circuit 6 calculates the total length of the selected code words W received so far by adding the length n of the current code word W to the variable L.

In a step 304, the modification circuit 5 checks whether the selected coefficient c(i,j) already represents the data bit b(k) to be embedded. To this end, the circuit checks whether the condition c(i,j) mod n=b(k) is fulfilled. In the present embodiment, where n=2, even coefficient values c(i,j) represent b(k)=0 and odd coefficient values represent b(k)=1. If the condition is fulfilled, no further action needs to be taken for the current DCT block. In a step 305, the switch 3 (FIG. 2) is then set to position "b" so as to pass on the received code word W to the output. In the same step, the length L' of the code words W transmitted so far is updated by adding the length n of code word W to the variable L'.

If the condition c(i,j) mod n=b(k) is not fulfilled, a step 306 is carried out in which the coefficient c(i,j) is modified so as to fulfill said condition. In the present embodiment (where the differential DC coefficient dc is processed and n=2), the modification includes adding +1 or −1 to the coefficient. The choice +1 or −1 is applied to the modification circuit 5 by the control circuit 6 so that the cumulative sum of differential DC coefficients in the output bit stream does not substantially differ from the corresponding sum in the input bit stream. This can be simply achieved by adding +1 and −1 alternately.

The modified coefficient c'(i,j) and its preceding run of zeroes, if applicable, are variable-length encoded by encoder 7 into a code word W'. In a step 307, the consequence of replacing the input coefficient c(i,j) by the modified coefficient c'(i,j) with respect to the length of the bit stream is evaluated. To this end, the sum L'+n' of the length L' of the code words already transmitted and the length n' of the modified code word W' is compared with the length L of the corresponding series of received code words. If L'+n' is larger than L, the modified coefficient is not transmitted. That is, the step 305 is performed in which the switch 3 is set to position "b" so as to transmit the unmodified coefficient c(i,j). If L'+n' is less than or equal to L, a step 308 is performed in which the switch 3 (FIG. 2) is set to position "a" so as to replace the received code word W by the modified code word W'. In the same step, the variable L' is updated by adding the length n' of code word W' thereto.

The above described replacement scheme ensures that the length of the output bit stream will never exceed the length of the received bit stream. It should be noted, however, that individual code words may be longer than their originals, provided that previous code words have been replaced by shorter ones. This is a significant improvement as compared with the prior art disclosed in the Hartung et al. reference discussed above.

Obviously, the length of the output bit stream can fall short of the length of the received bit stream. This is neither attractive because it may cause time stamps (132 in FIG. 1D) to be relatively shifted. It may also cause code words or parts thereof to be moved from one transport packet (131 in FIG. 1D) to another, which may be disadvantageous in applications such as digital video recording where signal processing is carried out at packet level. To this end, the flow of operations proceeds with a step 309, in which it is checked whether processing of a given sequence of code words has been completed. Such a sequence is, inter alia, the interval between successive time stamps, a transport packet, or a slice. As long as a sequence has not been completely processed, the program returns to the step 302 to embed the next data bit in the next DCT block. If a sequence has been processed, a step 310 is performed in which as many (viz. L–L') dummy bits are inserted at appropriate positions of the bit stream as are necessary to keep the number of bits constant. The program then returns to the step 301 to start a new sequence.

The above description will be further elucidated by means of a concrete example. In this example, the character "A" is to be embedded in an image having 40 pixels horizontally and 24 pixels vertically. The image is compressed in accordance with the MPEG standard. More particularly, the image is divided into 5×3 blocks of 8×8 pixels. Each block is discrete cosine transformed, yielding 5×3 DCT blocks having 8×8 coefficients each. Each row of 5 blocks is a slice. In FIG. 4, array 410 shows the differential DC coefficients of the blocks. The character "A" to be embedded in the image is represented by a 15-bit code, shown in the Fig. as an array 420. For convenience, the 15-bit code is a pattern of alternating 1 s and 0 s in this example. As will be appreciated in view of the foregoing description, the embedder will modify the differential DC coefficients into a pattern of alternating odd (for "1") and even (for "0") values. The transmitted coefficient pattern is denoted 430 in FIG. 4. As can be seen, there are two coefficients 431 and 432 that could not be modified. Redundancy in the character code table is provided to ensure that the pattern will nevertheless be decoded as the letter "A".

Some values of the transmitted array 430 will now be discussed. Reference is made to the following Table I which shows the lengths of variable-length code words for a range of differential luminance DC coefficient values in accordance with the MPEG standard.

TABLE I

| differential DC | −15 ... −8 | −7 ... −4 | −3,−2 | −1 ... 1 | 2,3 | 4 ... 7 | 8 ... 15 | 16 ... 31 | 32 ... 63 |
|---|---|---|---|---|---|---|---|---|---|
| code word length | 7 | 6 | 4 | 3 | 4 | 6 | 7 | 9 | 11 |

The processing of the first slice proceeds as follows:

The first code word represents a coefficient value (hereinafter c) of 62 having a length (hereinafter n) of 11 bits. The coefficient has a desired (even) value and does not need to be modified.
The second code word (c = 12, n = 7) is modified by adding +1 to the coefficient. The new code word (c' = 13) has the same length (n' = 7) and is transmitted.
The third code word (c = −1, n = 3) must be modified to assume an even value. The qualified way of modification at this stage is adding −1. However, the modified code word (c' = −2, n' = 4) may not replace the received code word because this would cause the number of transmitted bits (L' + n' = 22) to exceed the number of received bits (L = 21).
The fourth code word (c = 16, n = 9) must be modified. The type of modification to be applied is still adding −1. The code word can be replaced because the new code word (c' = 15) has a shorter length (n' = 7). The number of received bits is now 30 and the number of transmitted bits is 28.
As there is now spare space in the bit stream, the fifth code word (c = 7, n = 6) can be modified (c' = 8) even though the new code word is longer (n' = 7).

Three coefficients have been modified at the end of the first slice. The total number of bits is decreased by 1, which is compensated for by inserting one dummy bit at the end of the slice. Drift of the luminance DC level has been avoided by alternately adding +1 and −1 to the differential DC levels.

The second slice of the image has the same DC levels in this example. As the alternating pattern of 1 s and 0 s now starts with a "1", only the first coefficient needs to be modified. The respective code word (c=62, n=11) is replaced by (c'=63, n'=11). The number of bits in the slice is not altered.

The first code word (c=32, n=11) and third code word (c=0, n=3) of the third slice need no modification. The second code word (c=−2, n=4) is replaced by (c'=−1, n'=3). The fourth code word (c=10, n=7) is replaced by (c'=9, n'=7). The fifth code word (c=3, n=−4), however, cannot be replaced because transmitting the modified coefficient (c'=4) requires n'=6 bits, whereas only 1 spare bit is available at this stage.

FIG. 5 shows a schematic diagram of an arrangement for retrieving the auxiliary data from the MPEG bit stream. The arrangement comprises a parser 501 which extracts the predetermined code words W from the bit stream, a variable-length decoder 502 which decodes the coefficient c(i,j) having data embedded therein, and a symbol retrieving circuit 503 which calculates the modulo-n value of each coefficient c(i,j). In this embodiment, where n=2, the modulo-n value (i.e. 1 or 0) of each coefficient c(i,j) constitutes a bit b(k) of the embedded data. A message regenerator 504 performs the inverse operation of message generator 8 which is shown in FIG. 2 and converts combinations of symbols (here the bits embedded in an image) into a character of the message XD. It should be noted, however, that the message regenerator converts plural combinations of bits into the same character. For example, the array 610 of bits in FIG. 6 (which the arrangement retrieves if data is embedded in accordance with the example shown in FIG. 4) is the character "A", even though two bits 611 and 612 differ from the "original" code (420 in FIG. 4). Various means are known in the art, such as Hamming decoders or correlation detectors. A correlation detector calculates the correlation of the received code (610 in FIG. 7) with all character codes, and selects the character having the highest correlation.

A useful application of the invention is embedding a serial number identifying a digital home video recorder in MPEG contents recorded by said device. FIG. 7 shows schematically a diagram of such a video recorder. The recorder receives an MPEG bit stream MP to be recorded, and comprises a data embedder 701 corresponding to the arrangement which is shown in FIG. 2, conventional recording circuitry 702, and a removable record carrier 703, for example, a magnetic tape or optical disk. The data embedder 701 receives the data message XD in the form of a unique identification number 704 which is fixedly stored in the recorder. The operation of the recorder can easily be understood in view of the foregoing description of the data embedder. A decoder such as the arrangement which is shown in FIG. 5 decodes and displays the embedded serial number. The source of illegally copied material can thus easily be traced.

Figure 8:
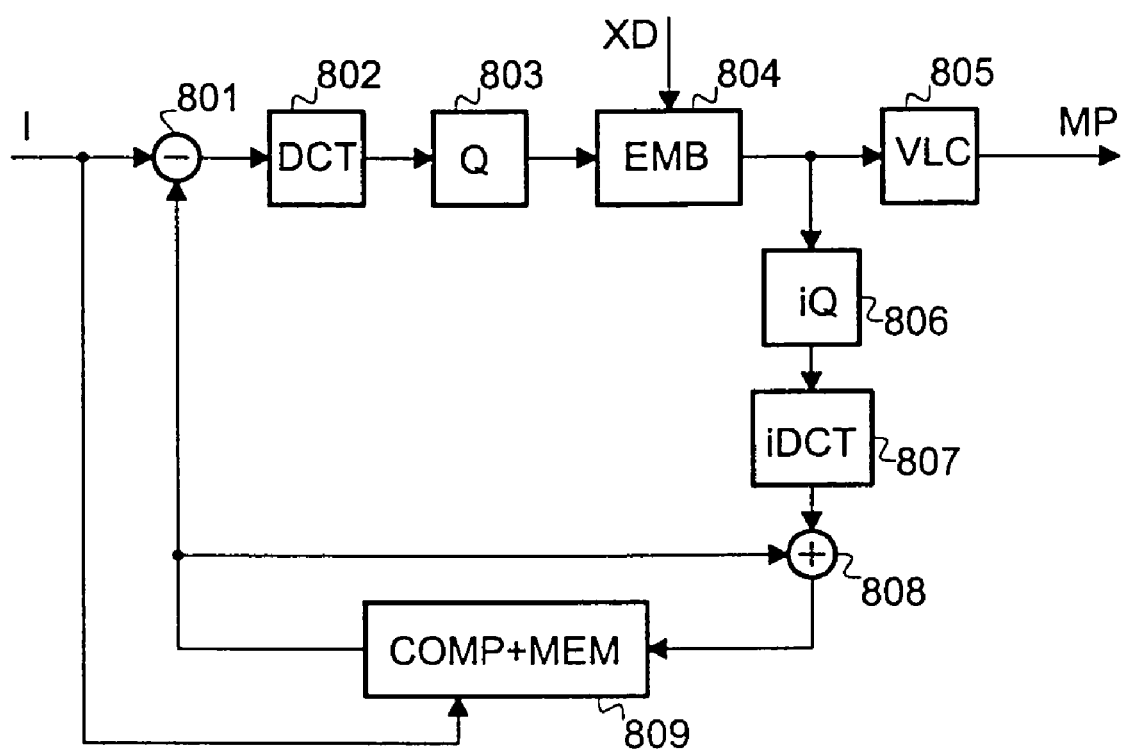
FIG. 8 shows an arrangement for encoding an uncompressed information signal into a compressed information signal and embedding auxiliary data in the compressed signal.

FIG. 8 shows an arrangement for encoding an uncompressed information signal I into a compressed information signal MP, which arrangement is adapted to embed auxiliary data in the compressed output signal. The arrangement, in this example an MPEG video encoder, comprises a subtracter 801 for subtracting a prediction image from the input image, a discrete cosine transform circuit 802, a quantizer 803, a data embedder 810, a variable-length encoder 804, an inverse quantizer 805, an inverse discrete cosine transform circuit 806, an adder 807, and a motion estimation and compensation stage including a frame memory 808. The circuit elements 801–808 constitute a well-known MPEG encoder and need no further explanation. The data embedder 810 receives an auxiliary data message XD to be embedded. It operates in a manner as described hereinbefore. That is, it includes a data symbol generator which generates a number of bits b(k) for each data word (cf. 8 in FIG. 2), a modification circuit which modifies a given transform coefficient c(i,j) (cf. 5 in FIG. 2), and a control circuit which, in an embodiment, determines whether +1 or −1 is to be added to the coefficient (cf. 8 in FIG. 2). A variable-length decoder (cf. 2 in FIG. 2) is not necessary in this arrangement. In principle, each given coefficient can be modified irrespective of the consequence thereof for the length of the corresponding variable-length code word. However, modification of AC coefficients having the value zero is preferably omitted because this would considerably affect the coding efficiency of the combined run length/Huffman coding performed by variable-length encoder 805.

Disclosed is a method of embedding auxiliary data (XD) in an information signal (MP), the signal samples of which are variable-length encoded, for example, an MPEG compressed video signal. Selected signal samples, e.g. given transform coefficients (c(i,j)) of the blocks constituting a video image, are retrieved by decoding (2) the corresponding variable-length code words (W). The selected signal samples are modified (5) so as to represent a data symbol (b(k)), and re-encoded (7). The modification of a signal sample is omitted (3) if this causes the length of a given sequence of code words (a slice, an MPEG transport packet) to exceed its original length, or if it affects the position of clock reference time stamps in the bit stream. Insertion of dummy bits compensates for a shortage of data in the sequence.

The invention claimed is:

1. A method of embedding auxiliary data (XD) in an information signal (MP), comprising the step of modifying selected signal samples so as to represent respective symbols of said auxiliary data, characterized in that said signal samples are transform coefficients (c(i,j)) obtained by transform coding the information signal and encoded into variable-length code words, the method further comprising the steps of:
   decoding a variable-length code word indicative of a selected coefficient;
   modifying said selected coefficient so as to represent an auxiliary data symbol;
   encoding the modified coefficient into a new variable-length code word; and
   replacing the old code word by the new code word;
   wherein said step of replacing the old code word by a new code word is omitted if said replacing causes the length of a given sequence of code words to substantially exceed the original length of said sequence; said old code word being replaceable with a longer code word as long as the length of the given sequence is compensated with a shorter replaced code word so that the length of the given sequence does not substantially exceed the original length of said sequence.

2. A method as claimed in claim 1, further including a step of inserting dummy bits in a field provided by the format according to which the signal has been coded, if said replacing causes the length of a given sequence of code words to substantially fall short of the length of the original sequence.

3. A method as claimed in claim 1, wherein the auxiliary data includes data words each represented by plural combinations of data symbols.

4. A method as claimed in claim 1, wherein said given sequence is a slice of an MPEG video signal.

5. A method as claimed in claim 1, wherein said given sequence is a transport packet of an MPEG transport stream.

6. A method as claimed in claim 1, wherein said given sequence is the sequence of code words between clock reference time stamps which are accommodated in the signal.

7. A method as claimed in claim 1, wherein the selected coefficient is a differential DC coefficient representing the difference between DC coefficients of successive blocks of coefficients.

8. A method as claimed in claim 7, wherein the step of modifying the selected coefficient comprises adding such a value that the sum of differential DC coefficients of a given series of blocks is not substantially modified.

9. A method as claimed in claim 7, wherein the series of blocks is a slice of an MPEG video signal.

10. A method as claimed in claim 1, wherein said data symbols are represented by modulo-n values of the selected coefficients, where n is a predetermined integer.

11. A method as claimed in claim 10, wherein n=2.

12. A method of recording an information signal on a storage medium, comprising the steps of:
   receiving a compressed information signal having signal samples in the form of transform coefficients obtained by transform coding the information signal and encoded into variable-length code words;
   embedding auxiliary data in said information signal, using a method as claimed in claim 1;
   recording said information signal with embedded auxiliary data on said storage medium.

13. An arrangement for embedding auxiliary data in an information signal, comprising means for modifying selected signal samples so as to represent respective symbols of said auxiliary data, characterized in that said signal samples are transform coefficients obtained by transform coding the information signal and encoded into variable-length code words, the arrangement further comprising:
   means for decoding a variable-length code word indicative of a selected coefficient;
   means for modifying said selected coefficient so as to represent an auxiliary data symbol;
   means for encoding the modified coefficient into a new variable-length code word; and
   means for replacing the old code word by the new code word,
   wherein said means for replacing are configured to omit replacing the old code word by the new code word if said replacing causes the length of a given sequence of code words to substantially exceed an original length of said sequence, said means for replacing being further configured to replace original code words with longer code words as long as the length of the given sequence is compensated with shorter replaced code words so that the length of the given sequence does not substantially exceed the original length of said sequence.

14. An arrangement for recording an information signal on a storage medium, comprising:
   means for receiving a compressed information signal having signal samples in the form of transform coefficients obtained by transform coding the information signal and encoded into variable-length code words;
   means for embedding auxiliary data in said information signal, using an arrangement as claimed in claim 13;
   means for recording said information signal with embedded auxiliary data on said storage medium.

* * * * *